Feb. 8, 1966　　H. MacINNES ETAL　　3,233,403
TURBOCHARGER MANUAL WASTEGATE SYSTEM WITH AUTOMATIC BOOST CONTROL
Filed July 29, 1963　　　　　　　　　　　　　　　　4 Sheets-Sheet 1
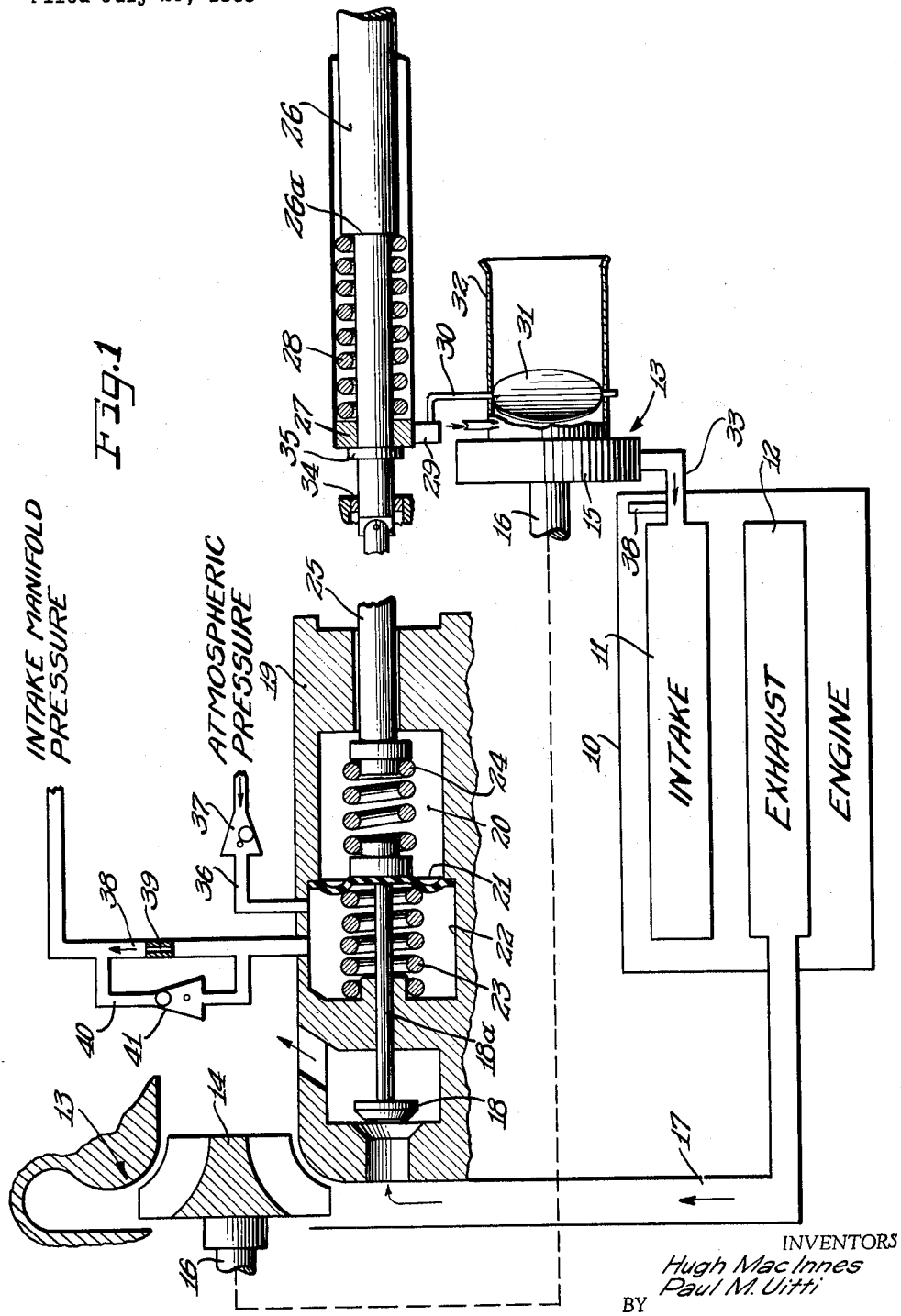
INVENTORS
Hugh MacInnes
Paul M. Uitti
BY
ATTORNEYS Feb. 8, 1966     H. MacINNES ETAL     3,233,403
TURBOCHARGER MANUAL WASTEGATE SYSTEM WITH AUTOMATIC BOOST CONTROL
Filed July 29, 1963     4 Sheets-Sheet 2
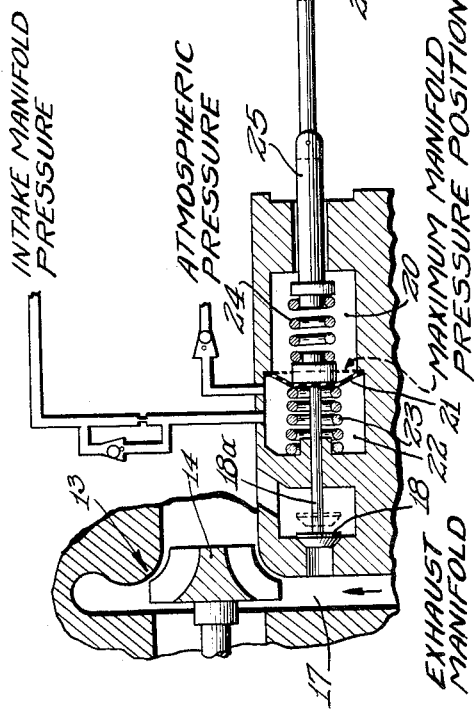
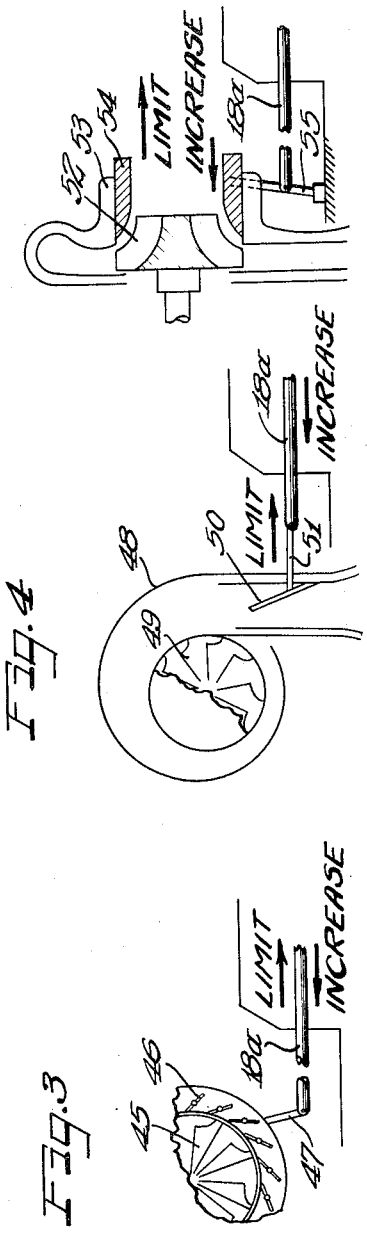
INVENTORS
Hugh Mac Innes
Paul M. Uitti
BY
ATTORNEYS INVENTORS
Hugh Mac Innes
Paul M. Uitti
by
ATTORNEYS INVENTORS
Hugh MacInnes
Paul M. Uitti

United States Patent Office

3,233,403
Patented Feb. 8, 1966

3,233,403
TURBOCHARGER MANUAL WASTEGATE SYSTEM WITH AUTOMATIC BOOST CONTROL
Hugh MacInnes, Richmond Heights, and Paul M. Uitti, Euclid, Ohio, assignors to TRW Inc., Cleveland, Ohio, a corporation of Ohio
Filed July 29, 1963, Ser. No. 298,043
6 Claims. (Cl. 60—13)

The present invention relates to improvements in control systems for turbochargers for internal combustion engines.

In a turbocharged gasoline engine such as the type for use on automobiles and embodied in the present invention, the turbocharger will essentially comprise a shaft with a compressor impeller on one end and a radial inward flow turbine wheel at the other end. The air fuel mixture enters the compressor and is compressed and passes to the intake manifold of the engine and thence to the combustion chambers. As the exhaust gases leave the combustion chambers and flow through the exhaust manifold they have increased to a considerably higher volume and temperature and the exhaust gas rotates the turbine wheel for operating the compressor. Since there is considerably more volume of gas going through the turbine wheel than through the compressor useful work is obtained out of the system and the air fuel mixture passes into the cylinder at a much higher than atmospheric pressure. Thus more pounds of air can be delivered to the engine compared to one which is naturally aspirated and therefore more fuel can be burned and more power obtained from the engine.

In the conventional carburetor for a gasoline engine the turbocharger cannot be practically used at partially open throttle position. The throttle and turbocharger are in effect working against each other since the throttle valve is tending to reduce the flow of air into the intake manifold and the turbocharger is tending to increase the air flow. To operate the turbocharger throughout the full range of engine operation at part throttle positions is inefficient and disadvantageous in that (a) this increases temperature of entering air, (b) this results in higher exhaust back pressures, (c) both of the foregoing reduce fuel economy, (d) there is a resultant loss of density of intake air, and (e) turbocharger operation is provided when it is not actually needed.

In automobile engines it is desirable to provide for maximum power to obtain maximum acceleration at low engine speeds. This is accomplished by reducing the size of the turbine housing to increase turbine speeds with less exhaust gases. However, this tends to overdrive the turbine at higher engine speeds. It is accordingly desirable for obtaining opitmum turbocharger design to provide turbocharging operation at low engine speeds and control the turbocharger preventing it from being over driven at higher engine speeds.

The foregoing problems are solved and the turbocharger of optimum usefulness and efficiency is obtained in accordance with the present invention by providing a turbocharger wherein the turbine has a normal predetermined speed which is a predetermined function of engine exhaust gas mass flow and temperature selected to provide adequate turbocharging at low engine speeds, and providing a first control means for reducing the speed of the turbine below the normal speed at throttle positions less than full throttle or, in other words, not driving the turbine until full throttle position, and obtaining a substantially free floating turbocharger operation at part throttle positions. A second control means is further provided which reduces the speed of the turbine below said normal speed at intake manifold pressures in excess of a predetermined pressure, operative after full throttle position.

It is accordingly an object of the present invention to provide a turbocharger control system for internal combustion engines and particularly well adapted for use in a gasoline engine for automobiles which permits providing a turbocharger of optimum capacity for low engine speeds and which will not overcharge or operate at dangerous conditions at higher engine speeds.

A further object of the invention is to provide a turbocharger for a gasoline engine supplied by a carburetor wherein operation is improved and efficiency is enhanced by operating the turbocharger only at full throttle positions.

A still further object of the invention is to provide an improved turbocharger control system for automatically controlling operation of a turbocharger and reducing its normal predetermined operation speed at conditions less than full throttle and at maximum intake manifold pressures.

Still another object of the invention is to provide an automatic turbocharger control system which is reliable in operation and operates to reduce the output of a turbocharger at predetermined conditions and which is well adapted for operation with various types of gas flow control mechanisms for the turbine of the turbocharger.

Still a further object of the invention is to provide a turbocharger control system which is simply operated by the throttle valve control linkage and by intake manifold pressure.

A further object of the invention is to provide a turbocharger control system which is well adapted to being operated by a source of fluid pressure such as the pressure of the oil system of the engine and which has features making it fail safe with failure of the oil system, causing the unit to slow down.

A further object of the invention is to provide a turbocharger control system which is of the pressure ratio type measuring the pressure ratio across the compressor thus substantially being a speed control because of the relationship between speed and pressure ratio.

A further object of the invention is to provide a turbocharger control system wherein the turbocharger is operated in a free floating condition up to full throttle portions and a valving arrangement such as a waste gate or by-pass valve is closed after full throttle positions to operate the turbocharger at full capacity relative to the available exhaust gases and wherein the throttle valve mechanism is overridden by a system responsive to intake manifold pressure to prevent overcharging.

Other objects, advantages and features will become more apparent with the teaching of the principles of the invention in connection with the disclosure of the preferred embodiments thereof in the specification, claims and drawings in which:

FIGURE 1 is a somewhat schematic view of an engine and turbocharger system with a control in accordance with the principles of the present invention;

FIGURE 2 is a fragmentary view of FIGURE 1 showing the control mechanism operative to direct a full flow of exhaust gases to the turbocharger, with FIGURE 1 showing the turbocharger in free floating operation;

FIGURE 3 is a fragmentary view of another type of turbocharger gas flow control;

FIGURE 4 is a fragmentary somewhat schematic view illustrating another form of turbocharger gas flow control;

FIGURE 5 is a fragmentary somewhat schematic view illustrating still another form of turbocharger gas flow control;

On the drawings:

Figure 6:
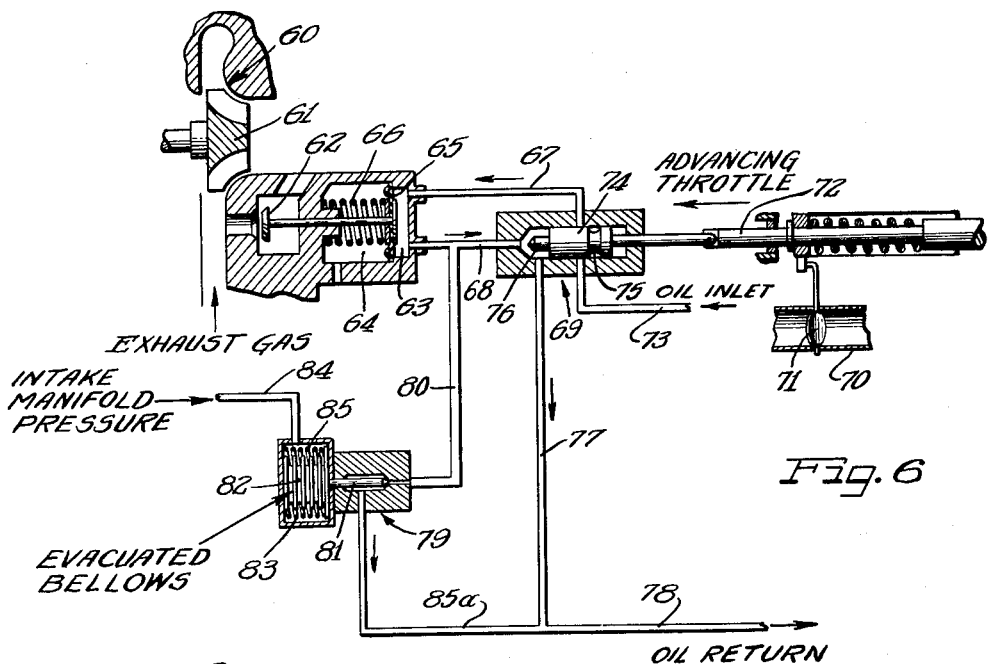
FIGURE 6 is a schematic view of another form of the control operated by engine oil pressure with the parts shown at positions of less than full throttle.

FIGURES 1 and 2 illustrate an engine 10 with an intake manifold 11 and an exhaust manifold 12. The engine is turbocharged by a turbocharger 13 having a gas driven turbine 14 and a compressor 15 with the turbine wheel and compressor rotor mounted on a common shaft 16. The turbine wheel is driven by exhaust gases passing through conduit means 17 connected between the engine exhaust and the turbine, and the compressed air fuel mixture from the turbocharger flows through a conduit 33 into the intake manifold 11.

The turbocharger is designed to have a predetermined normal speed which is a predetermined function of engine exhaust gas mass flow and temperature of the gas received from the exhaust manifold 12. In accordance with the principles of the present invention the turbine is designed to operate at this normal speed for optimum supercharging at lower engine speeds, if the engine is to be used in automobiles, for example, and the turbine is automatically controlled to operate below said normal speed under two conditions of engine operation. The first condition is at throttle positions less than full throttle and the turbine will be driven by only part of the exhaust gases. The second condition is at a maximum intake manifold pressure and the turbine will operate at less than said predetermined normal speed. Reduced operation of the turbine is obtained by suitable flow regulating means for regulating the flow of gas through the turbine and reducing the speed of the turbine. This mechanism may take various forms and one preferred form is a by-pass valve 18 which permits gases to by-pass the turbine when the valve 18 is open. The present arrangement makes operation possible with a simplified poppet valve which has advantages over other types of valves for handling exhaust gases.

The control system is incorporated in a housing 19 which may be part of the turbocharger housing and which is provided with a chamber 20 therein. The chamber has a movable wall or diaphragm 21 extending thereacross sealed at its edges to the chamber walls so that the chamber has a sealed end 22, which may hereinafter be referred to as a closed chamber 22.

In the closed chamber is a coil compression spring 23 which applies a biasing force to the diaphragm 21 to pull the valve 18 to open position. The diaphragm is connected to a valve stem 18a which functions as a valve operating rod in the event other types of valves are used as will be described in connection with FIGURES 3 through 5.

At the other side of the diaphragm 21 is a spring 24 which provides a link between the diaphragm and a throttle operating control rod 25 which is joined to another throttle operating control rod 26 that is operated to control the speed of engine operation.

The throttle operating rod 26 has a sleeve 27 around it housing a spring 28 which engages an abutment 26a on the rod in order to move the sleeve. The sleeve has a lug 29 which connects to an arm 30 on a throttle valve 31 in the air intake passage 32 of the carburetor leading to the compressor section 15 of the turbocharger 13.

The air fuel mixture from the carburetor is delivered by the compressor 15 through a line 33 leading to the intake manifold 11.

The throttle operating control rods 25 and 26 will not override the spring 23 and will not close the poppet valve 18 at positions where the throttle valve 31 is partly open. However, when the throttle valve 31 reaches the fully open position, as shown in FIGURE 2, spring 24 will override the spring 23 closing the valve 18.

Thus the turbine 13 will not operate at conditions less than full throttle, and when full throttle position is reached, by the operator pushing the control rod 26 past full throttle position, all of the exhaust gases in the line 17 will be delivered to the turbine 14 to operate the turbocharger 13. This will occur at any engine speed merely by the operator pushing the rod 26 past full throttle position. However, at less than full throttle position the turbocharger will not operate and thus does not in effect "fight" the throttle valve in attempting to increase the density of air in the intake manifold while the throttle valve is reducing its density.

Since the turbocharger is designed with a small turbine housing to be able to turbocharge at lower engine speeds when a small volume of exhaust gas is present, the automatic control mechanism is designed to prevent overcharging at high engine speeds by a second control mechanism which is responsive to intake manifold pressure and which reduces the normal operating speed of the turbine. By the control mechanism operating directly off intake manifold pressure, it actually is directly responsive to the pressure which it is controlling.

Connected to a closed chamber 22 is an atmospheric pressure line 36 having a check valve 37 therein. The check valve 37 is open during normal range of engine operation at less than fully open throttle position and at intake manifold vacuum, so that the pressure on both sides of the diaphragm 21 is substantially equal. Also connected to the closed chamber 22 is an intake manifold pressure line 38. The line 38 has a restriction 39 therein. A branch or by-pass line 40 connects the line 38 around the restriction 39 and has a check valve 41 therein. Since there is a vacuum in the intake manifold at normal operating conditions at less than full throttle position, there will be a flow of air through the intake line 36, into the chamber 22 and into the intake manifold through line 38 thus creating a pressure drop across the restriction 39, so that the check valve 41 will remain closed.

When full throttle position is reached so that intake manifold pressure drops to substantially atmospheric, the check valve 41 will open. As intake manifold pressure increases the check valve 37 in the atmospheric pressure line 36 will close thus permitting the chamber 22 to be pressurized so that the pressure therein acts against the diaphragm 21. When the intake manifold pressure reaches a predetermined maximum, the force on the diaphragm 21 will be sufficient to overcome the force of the spring 24 so that the valve 18 will be opened, and this is shown by the position of the elements in their dotted line location of FIGURE 2.

The restriction or bleed orifice 39 with the by-pass check valve 41 provides for faster response when the mechanism is moved past open throttle position. The force of springs 23 and 24 relative to the area of the diaphragm 21 is determined so that the valve 18 will stay open until full throttle position is reached, and so that the valve 18 will again be opened at a predetermined maximum intake manifold pressure thus limiting the turbocharger boost pressure to some predetermined amount. To avoid overcompressing spring 24 a stop 34 is provided for the throttle valve operating rod 26 which carries a collar 35 that engages the stop 34 as shown in the position of FIGURE 2.

It will of course be recognized that other forms of stops may be used and other mechanical linkage may be employed for operating the throttle valve 31 and transmitting the position of its linkage to the control mechanism so that valve 18 will be closed at position of the throttle linkage past full throttle position.

Other forms of gas flow regulating means should be employed for the turbine 14, and FIGURE 3 shows a turbine wheel having a turbine nozzle ring 46 thereon with movable vanes operated by an arm 47 which connect to the rod 18a. As the rod 18a is moved to the right the discharge of the turbocharger will be limited, and as the rod 18a is moved to the left the discharge of the turbocharger will be increased. Regardless of the position of the vanes all of the gas will flow through the turbine blades 45, but the very position of the vanes will change the effective force of the gas on the vanes so that the turbine will operate over a range of minimum to maximum power.

FIGURE 4 shows another turbocharger arrangement with a turbine wheel 49 and a gas delivery passage 48 having a variable throat and valve 50. The valve is operated by a link 51 connected to the rod 18a, and movement of the rod 18a to the right, by the design of the turbocharger, will limit the output, and movement of the rod 18a to the left will increase the output. In any position of the valve 50 all of the gas will flow through the turbine wheel 49 but the path of flow as controlled by the position of the valve 50 regulates the effective action of the gas on the turbine wheel 49 so that it operates from a condition of minimum to a condition of maximum power dependent on the valve position.

FIGURE 5 illustrates another form of turbocharger with a turbine wheel 52 and an annular inlet collar 53 leading to the wheel and provide with a sliding sleeve 54. The sleeve is slid axially by an arm 55 connected to the rod 18a, and movement of the rod 18a to the left will increase the output of the turbocharger and movement of the rod 18a to the right will limit the output of the turbocharger. This structure is capable of using a small turbine housing which, as above stated, is desirable for charging at low engine speeds. In any position of the sleeve 54 all of the gas flows past the turbine wheel 52, but the gas will be more effective upon the wheel as the sleeve is moved axially toward the wheel so that a condition ranging from minimum to maximum power will occur as the sleeve is moved from its most remote to its closest position to the wheel.

Figure 7:
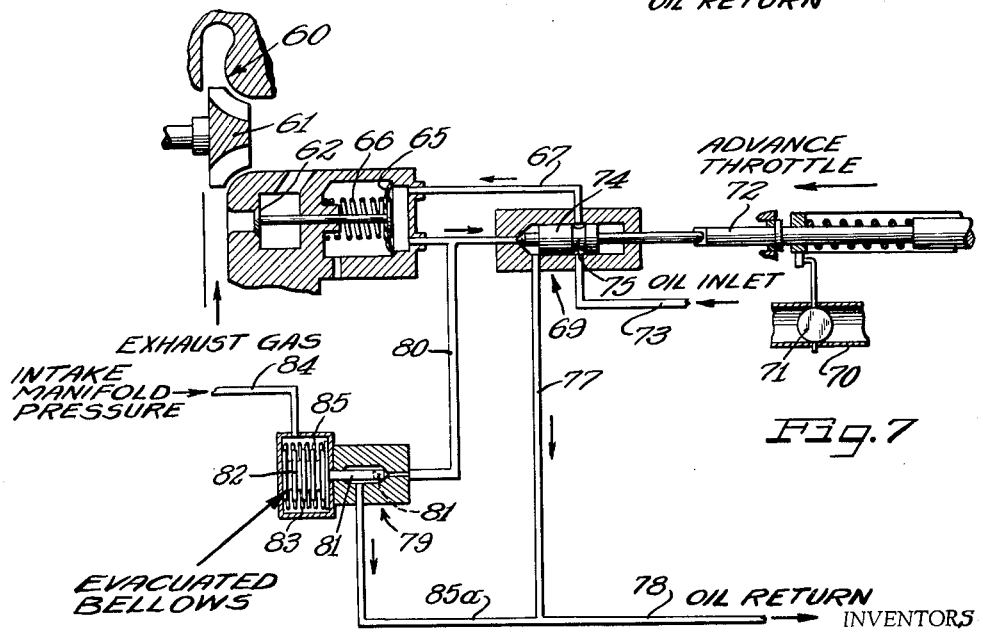
FIGURE 7 is another view of the mechanism of FIGURE 6 showing the position of the parts at fully opened throttle position.

In the arrangement of FIGURES 6 and 7 controls for a turbocharger are shown operated by engine oil pressure.

The turbocharger arrangement is substantially the same as with the structure of FIGURES 1 and 2, and incorporates a turbocharger 60 with a turbine wheel 61 therein and a by-pass waste gate valve 62 which opens to by-pass exhaust gas and reduce the output of the turbocharger 60. It will of course be understood that other forms of conduits and valves may be used for controlling the flow of gas to the turbine.

In the control housing is a chamber with a diaphragm 65 extending thereacross providing a closed oil chamber 63 and an open chamber 64 which contains a coil compression spring 66 acting against the diaphragm 65 to hold the waste gate valve 62 open. The waste gate valve 62 remains in the position shown in FIGURE 6 at positions of part throttle with the oil pressure chamber 63 being vented through a line 68 which communicates with a line 77 leading to the oil outlet or return line 78.

A first control means is provided by a valve 69 preventing closing of the waste gate valve until full throttle position. A throttle operating linkage 72 has substantially the same structure as the linkage of FIGURES 1 and 2 and controls a throttle valve 71 in a carburetor intake passage 70. The valve 69 has a valve plunger 74 with an annular groove 75 therearound, and when full throttle position is reached as shown by the position of the parts in FIGURE 7, the groove 75 connects a pressure oil inlet line 73 to the line 67 to apply a force against the diaphragm 65 and close the valve 62. The relief line 68 will be closed by a tip 76 on the valve plunger 74.

At a predetermined maximum intake manifold pressure the oil pressure will be relieved from the chamber 63 by a relief valve 79. The valve 79 includes a closed chamber 85 which is connected to intake manifold pressure through a line 84. In the chamber is an evacuated bellows 82 having a movable end wall connected to a valve plunger 81. Under intake manifold vacuums and other intake manifold pressures up to said predetermined maximum the valve plunger 81 will close off the line 80, but at said maximum pressure the bellows will be compressed against the action of a spring 83 to withdraw the valve plunger 81 and permit the escape of oil in the chamber 63. The oil escapes down through line 85a to the oil outlet line 78, and this is shown by the dotted line position of the valve 79 in FIGURE 7.

Thus available oil pressure is employed for operating the mechanism and a fail safe feature is provided in that if the oil pressure to the control system fails so that the control will not function properly, the spring 66 will hold the by-pass valve 62 in the open position.

Figure 8:
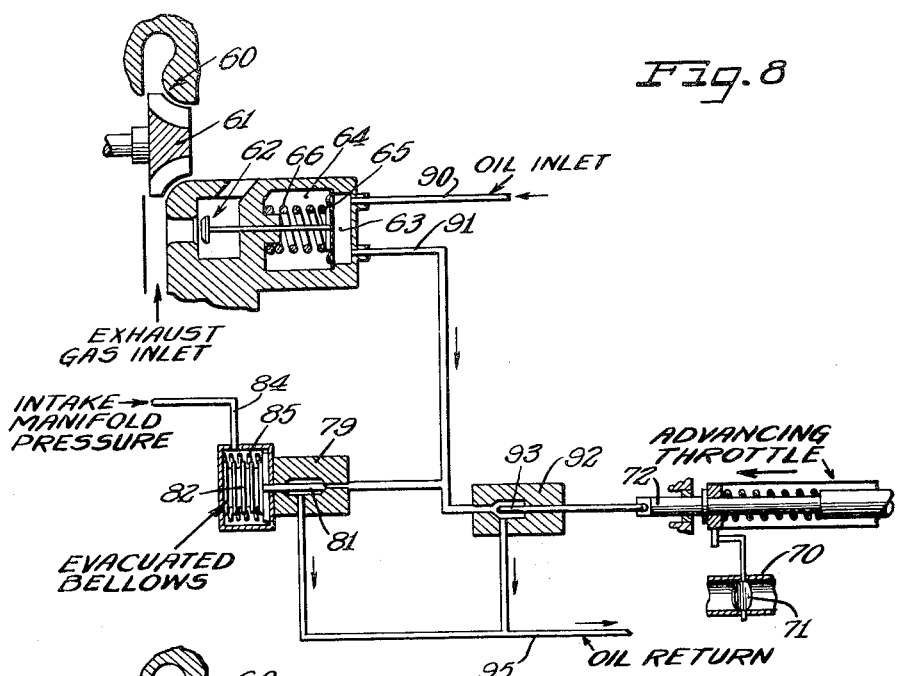
FIGURE 8 is a schematic illustration of another form of control showing the position of the parts at less than full throttle position.
Figure 9:
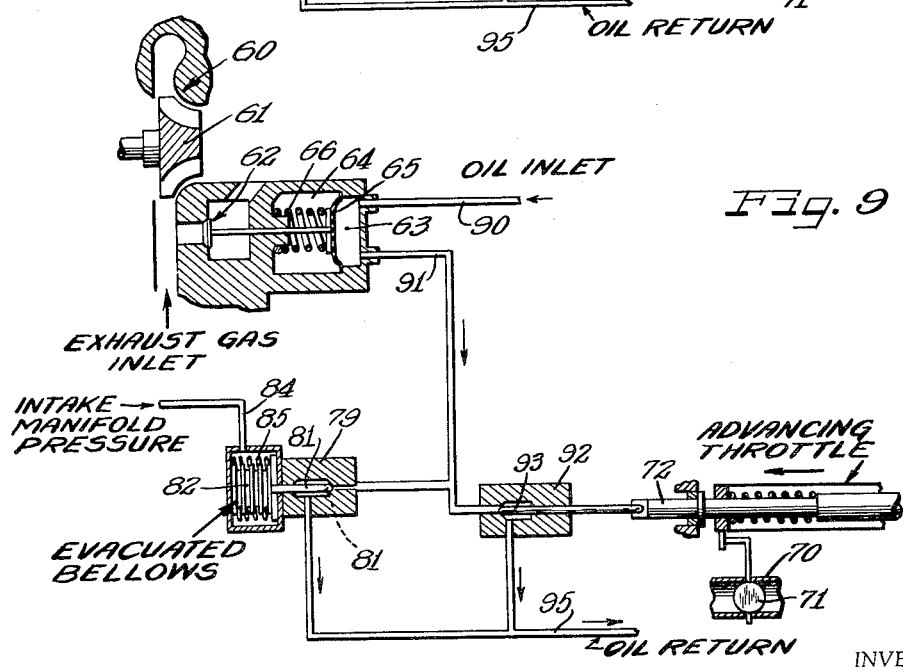
FIGURE 9 is another view of FIGURE 8 showing the position of the parts at fully opened throttle position.

FIGURES 8 and 9 illustrate another arrangement employing engine oil pressure. In these figures the oil pressure chamber 63 of the control is supplied continually with oil through an oil inlet line 90. The oil under conditions less than full throttle position is permitted to escape through a return line 91 which leads through a valve 92 to an oil return line 95. At positions less than full throttle, the valve has a plunger 93 which is maintained open by the throttle operating linkage 72 as shown in FIGURE 8.

At throttle linkage positions past full throttle, the plunger 93 is closed, as shown in FIGURE 9, so that oil pressure immediately builds up in the chamber 63 to close the by-pass valve 62.

The relief valve 79 functions substantially in the same manner as in the structures of FIGURES 6 and 7. At positions past full throttle, when intake manifold pressure reaches a predetermined maximum, the valve plunger 81 will be withdrawn to the left, as shown by the dotted line position of FIGURE 9, thus relieving oil pressure from the chamber 63 to permit the spring 66 to open the by-pass valve 62.

Thus it will be seen that we have provided an improved turbocharger control system which meets the objects and advantages above set forth. The system is constructed and operates so that various types of gas flow mechanisms may be used and particularly a conventional poppet type valve may be employed which provides a positive seating valve for efficient turocharger performance during the period when no by-passing is desired. The control sensor is a diaphragm (or bellows) type pressure sensing unit working from the intake manifold pressure rather than the pressure of exhaust gases and thus senses the pressure which must be controlled.

The control system increases engine efficiency and provides improved fuel economy with reduced exhaust manifold back pressures and reduced exhaust valve temperatures over devices heretofore used, and the device is compact and reliable permitting a continued long operating life without attention or adjustment.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A turbocharger system for an internal combustion engine comprising, an exhaust gas driven turbine, a compressor driven by the turbine connected to the engine intake manifold, conduit means connected between the engine exhaust and the turbine, said turbine having a predetermined normal speed which is a predetermined function of engine exhaust gas mass flow and temperature, a flow regulating means exposed to said mass flow for regulating the flow of gas through the turbine for regulating the speed of said turbine below said normal speed, a closed chamber connected to intake manifold pressure, a movable wall in said chamber connected to said regulating means and movable in a first direction to decrease turbine speed and in a second direction to increase turbine speed, spring means biasing said wall in said first direction, manually operated means for moving the wall in said second direction opposing the force on said flow regulating means, and an intake manifold pressure line connected to said chamber for moving said wall against the force of said manually operated means in said first direction at intake manifold pressures in excess of a predetermined maximum pressure.

2. A turbocharger system for an internal combustion engine comprising, an exhaust gas driven turbine, a compressor driven by the turbine connected to the engine intake manifold, conduit means connected between the engine exhaust and the turbine, said turbine having a predetermined normal speed which is a predetermined function of engine exhaust gas mass flow and temperature, a flow regulating means for regulating the flow of gas through the turbine for regulating the speed of said turbine below said normal speed, a closed chamber connected to intake manifold pressure, a pressure responsive member connected to said chamber and to said regulating means, an intake manifold pressure line connected to said chamber, an atmospheric pressure line connected to said chamber, and a check valve in said atmospheric pressure line closing with pressures in said chamber above atmospheric pressure and opening at pressures less than atmospheric with said lines sized so that the chamber will be at atmospheric pressure with a vacuum in the intake manifold and will be at manifold pressure at positive manifold pressures, said pressure responsive member operating said regulating means at a predetermined maximum manifold pressure to reduce the speed of the turbine below said normal speed.

3. A turbocharger system for an internal combustion engine comprising, an exhaust gas driven turbine, a compressor driven by the turbine connected to the engine intake manifold, conduit means connected between the engine exhaust and the turbine, said turbine having a predetermined normal speed which is a predetermined function of engine exhaust gas mass flow and temperature, a flow regulating means for regulating the flow of gas through the turbine for regulating the speed of said turbine below said normal speed, a closed chamber connected to intake manifold pressure, a pressure responsive member connected to said chamber and to said regulating means, an intake manifold pressure line connected to said chamber, an atmospheric pressure line connected to said chamber, a check valve in said atmospheric pressure line, a reduction in said manifold pressure line, a by-pass branch line around said restriction, and a check valve in said branch line arranged to close with pressure drop across said restriction at manifold vacuums and to open at positive intake manifold pressure so that said check valve in the atmospheric line will rapidly close for the increase in pressure in the chamber and the operation of said regulating means to reduce the normal speed of said turbine at a predetermined maximum intake manifold pressure.

4. A turbocharger system for an internal combustion engine comprising, an exhaust gas driven turbine, a compressor driven by the turbine connected to the engine intake manifold, conduit means connected between the engine exhaust and the turbine, said turbine having a predetermined normal speed which is a predetermined function of engine exhaust gas mass flow and temperature, a flow regulating means for regulating the flow of gas through the turbine for regulating the speed of said turbine below said normal speed, a closed chamber connected to intake manifold pressure, a pressure responsive member connected to said chamber and to said regulating means operating due to sub-atmospheric pressure in the intake manifold and applying a speed reducing force increasing with increased vacuum tending to thereby maintain the turbine inactive at low manifold pressures, and the throttle operator also connected to said member and yieldingly overriding the force of pressure in said chamber bringing the turbine speed up to normal speed at throttle positions past full throttle.

5. A turbocharger system for an internal combustion engine comprising, an exhaust gas driven turbine having a turbine wheel, a compressor driven by the turbine connected to the intake manifold of the engine, conduit means connected between the exhaust of the engine and the turbine, a poppet by-pass valve opening the conduit means for the escape of exhaust gas before it reaches the turbine, a closed chamber, a diaphragm across said chamber connected to the stem of the poppet valve, a first spring in the chamber acting against a first side of the diaphragm urging the poppet valve to open position, a second spring at a second other side of the diaphragm for urging the poppet valve to a closed position, a throttle operator rod connected to said second spring, said throttle operator valve connected to the throttle valve of the engine and movable to close said poppet valve only at positions past full throttle position, an atmospheric pressure line connected to the chamber on the first side of the diaphragm exposed to said first spring, an intake manifold pressure line connected to said chamber on the first side of said diaphragm, a check valve in said atmospheric pressure line closing with a pressure within the chamber in the first side of the diaphragm in excess of atmospheric pressure, a restriction in said manifold pressure line, a branch by-pass line leading around said restriction, and a check valve in said branch line closing at intake manifold vacuums and opening at intake manifold positive pressures for rapidly building up pressure in the first side of the diaphragm and opening the poppet valve at said maximum intake manifold pressures.

6. A turbocharger system for an internal combustion engine comprising, an exhaust gas driven turbine, a compressor driven by the turbine connected to the engine intake manifold, conduit means connected between the engine exhaust and the turbine,
    said turbine having a predetermined normal speed which is a predetermined function of engine exhaust gas mass flow and temperature,
a flow regulating means for regulating the flow of gas through the turbine for regulating the speed of said turbine below said normal speed,
a chamber,
means including a diaphragm across said chamber connected to said regulating means and operable in one direction by a force of the gas mass flow by a pressure differential for operating said regulating means,
a throttle operator for actuating the throttle valve of the engine,
and spring means connected to said diaphragm and connected to the throttle operator for applying a force to said diaphragm opposing said one direction thereby operating the regulating means for driving the turbine at said normal speeds only after full throttle position of the throttle operator and applying a force through said spring means which varies as a function of the position of the throttle operator and of the diaphragm.

References Cited by the Examiner
UNITED STATES PATENTS

| | | | |
|---|---|---|---|
| 2,024,202 | 12/1935 | Berger | 123—119 |
| 2,400,306 | 5/1946 | Hobbs | 123—119 |
| 2,480,621 | 8/1949 | Warner | 60—13 |
| 2,731,792 | 1/1956 | Nallinger | 60—13 |
| 2,771,239 | 11/1956 | Moreillon | 230—114 |
| 2,985,427 | 5/1961 | Houghton | 253—52 |
| 3,035,408 | 5/1962 | Silver | 60—13 |

MARK NEWMAN, *Primary Examiner.*

JULIUS E. WEST, RICHARD B. WILKINSON,
*Examiners.*